United States Patent [19]

Kapsales

[11] Patent Number: 5,862,209
[45] Date of Patent: *Jan. 19, 1999

[54] METHOD FOR PROVIDING CALLER DIRECTIVE ANNOUNCEMENTS IN A PERSONAL COMMUNICATION SYSTEM

[75] Inventor: Peter Kapsales, Woodinville, Wash.

[73] Assignee: AT&T Corp, Middletown, N.J.

[*] Notice: This patent issued on a continued prosecution application filed under 37 CFR 1.53(d), and is subject to the twenty year patent term provisions of 35 U.S.C. 154(a)(2).

[21] Appl. No.: 391,803

[22] Filed: Feb. 21, 1995

[51] Int. Cl.⁶ ...................................................... H04M 3/44
[52] U.S. Cl. ............................ 379/214; 379/67; 379/201; 379/210
[58] Field of Search .................................. 379/67, 68, 84, 379/88, 89, 201, 210, 211, 212, 213, 214, 56.1, 70, 71, 93.24, 100.08, 207, 217

[56] References Cited

U.S. PATENT DOCUMENTS

| | | | |
|---|---|---|---|
| 4,277,649 | 7/1981 | Sheinbein | 179/18 |
| 4,313,035 | 1/1982 | Jordan | 179/18 |
| 5,199,062 | 3/1993 | Meister et al. | 379/67 |
| 5,239,577 | 8/1993 | Bates et al. | 379/201 |
| 5,276,731 | 1/1994 | Arbel et al. | 379/88 |
| 5,327,486 | 7/1994 | Wolf et al | 379/96 |
| 5,329,578 | 7/1994 | Brennon et al. | 379/67 |
| 5,392,342 | 2/1995 | Rosenthal et al. | 379/211 |
| 5,406,557 | 4/1995 | Boudoin | 370/61 |
| 5,428,678 | 6/1995 | Fitzpatrick et al. | 379/201 |
| 5,430,791 | 7/1995 | Feit et al. | 379/67 |
| 5,434,908 | 7/1995 | Klein | 379/88 |
| 5,434,910 | 7/1995 | Johnson et al. | 379/89 |
| 5,436,963 | 7/1995 | Fitzpatrick et al. | 379/212 |
| 5,467,388 | 11/1995 | Redd, Jr. et al. | 379/196 |
| 5,548,637 | 8/1996 | Heller et al. | 379/201 |
| 5,555,291 | 9/1996 | Inniss et al. | 379/67 |
| 5,572,577 | 11/1996 | Harrila | 379/67 |

FOREIGN PATENT DOCUMENTS

| | | | |
|---|---|---|---|
| PCT/US90/ 06729 | 11/1990 | WIPO | H04M 11/00 |
| 9429992 | 12/1994 | WIPO | 379/283 |

Primary Examiner—Scott L. Weaver

[57] ABSTRACT

In a personal communication service (PCS) environment, a plurality of messages are stored which are used to provide caller directive announcements. The caller directive announcements are associated with tag messages previously stored by a subscriber, and are sufficiently detailed to tell a caller, for example, that a subscriber is in a hotel and, thus, should be asked for by name.

9 Claims, 2 Drawing Sheets

METHOD FOR PROVIDING CALLER DIRECTIVE ANNOUNCEMENTS IN A PERSONAL COMMUNICATION SYSTEM

TECHNICAL FIELD

This invention relates to personal communications and, more particularly, to a method of playing pre-recorded announcements to a caller, which announcements are based on a subscriber's location.

BACKGROUND OF THE INVENTION

Personal communication service (PCS) is a service in which subscribers, rather than locations or telephone stations, are assigned a personal telephone number. Calls placed to a subscriber's personal telephone number are routed to the subscriber at a telephone near that subscriber's current location. In order to provide a subscriber with such a personal communication service, e.g., as disclosed in U.S. Pat. No. 4,313,035, issued to Jordan, et al, the system providing the service (PCS system) must be supplied with the telephone number of a telephone near the subscriber's current location to which it should route calls placed to his personal telephone number. Each time the subscriber changes his location, the telephone number to which calls placed to his personal telephone number are routed must be changed. This requires the subscriber to call into the PCS system and to supply the telephone number to which his calls should currently be routed. Constantly having to call in to the PCS system can be tiresome, and supplying a ten-digit telephone number each time a subscriber changes his location is cumbersome.

To overcome these drawbacks, one prior art solution is to program a sequence of telephone numbers at any one of which the personal telephone service subscriber might be reached. The telephone numbers in a sequence are typically those of locations where a person is likely to be at various times throughout the day, such as "home," "car phone," "office," "pager," etc. When a call is made to the subscriber's personal telephone number, the PCS system attempts to complete the call by sequentially routing the call to each telephone number of the sequence. This process continues until: (a) the call is answered; (b) the call is abandoned; (c) the line associated with the telephone number is determined to be busy; or (d) until a predetermined period of time has elapsed. However, requiring the sequence of calls to be set by the subscriber in advance, and being the same for all callers, is inflexible.

Other special telephone calling systems that require a caller to enter a personal identification number (PIN) to determine to which of several potential destinations a call should be routed, are cumbersome, in that for each person a caller wishes to call, he might be required to learn a separate PIN.

Other systems exist in which calls are forwarded, or priority levels (call screening) are selected based on Automatic Number Identification (ANI). In these systems the subscriber can choose the maximum number of rings to occur at a particular location, or tailor the response of an answering machine based on the ANI. Other similar systems are described in U.S. Pat. Nos. 5,199,062 and 5,239,577.

Another related patent of interest is U.S. Pat. No. 5,430,791, which patent is assigned to the same assignee as is the instant application.

However, none of the prior art systems give the calling party the flexibility of specifically providing caller directive announcements which indicate the location or status of the subscriber.

SUMMARY OF THE INVENTION

Prior art PCS systems provide certain limited audio messages to be played to a caller in response to predetermined conditions. However, such systems do not allow specific caller directive announcements, which greatly aid a caller in rapidly reaching a subscriber.

The instant invention allows a caller to hear a specific caller directive announcement, such as, for example, "Your party is in a hotel, please ask for them by name."

Such location specific, or status specific announcements, are achieved by associating a pre-defined mnemonic tag with the caller directive announcement.

Specific tags, such as "hotel" or "restaurant" are stored in a data base by the subscriber and associated with a specific telephone number, and a specific caller directive announcement. The PCS system platform accesses a specific tag in response to a call, which can be prompted by an ANI or PIN access system. Upon accessing the tag, the caller directive announcement is recalled and played to the caller.

DETAILED DESCRIPTION

Figure 1:
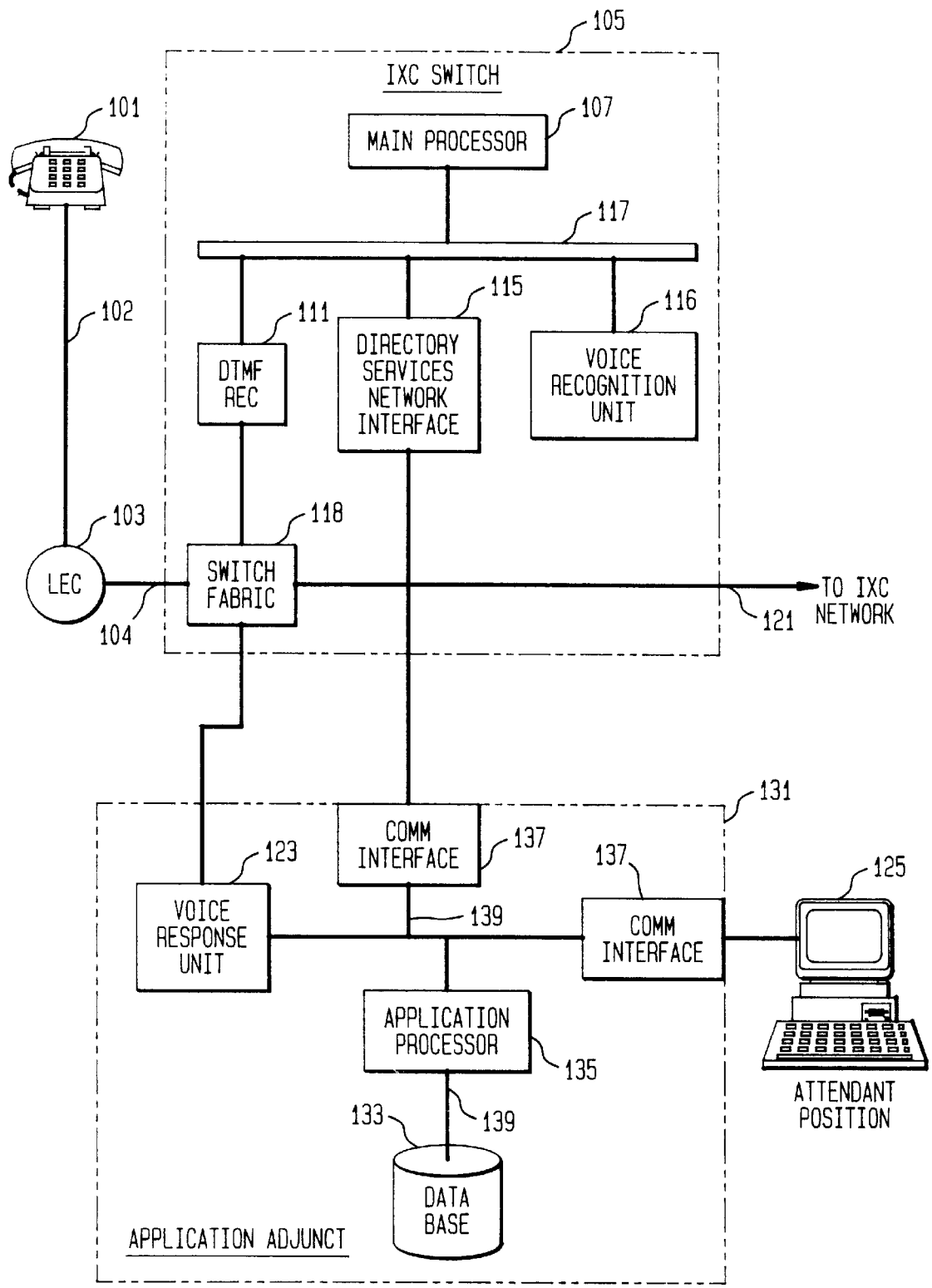
FIG. 1 shows an exemplary embodiment of a system for providing personal communication services in accordance with the principles of the invention.

Referring now to FIG. 1, there is shown an exemplary embodiment of a PCS system in accordance with the principles of the invention. Shown are: (a) telephone station 101, from which calls to a personal telephone number may be originated or received; (b) telephone line 102, of telephone station 101, which is provisioned with the well-known call waiting feature; (c) local exchange carrier (LEC) 103; (d) IXC switch 105; (e) application adjunct 131; and (f) attendant position 125.

Application adjunct 131 performs the necessary processing for: (1) storing an association between (a) a telephone number, (b) a pre-defined, mnemonic tag, and (c) a corresponding identifier; (2) developing and storing sequences of telephone numbers for PCS calls, which may be referred to herein as "quick sequences;" (3) associating quick sequences with the telephone numbers of potential calling telephones; and (4) supplying the telephone numbers of destinations to which IXC switch 105 should route a call placed to a subscriber's personal telephone number, in accordance with the principles of the invention. Application adjunct 131 includes: (a) application processor 135; (b) data base 133; (c) voice response unit 123; and (d) communication interfaces 137. Application processor 135 controls the overall operation of application adjunct 131 by performing any necessary processing and exchanging messages with the other components of application adjunct 131 over links 139. Links 139 convey information in digital form and need not all be of the same type or speed, e.g., one may be ethernet link, while the others may be RS-232C links. Data base 133 stores the information required by application processor 135 to control application adjunct 131, e.g., program code and data.

Voice response unit 123 can make various announcements which can be heard by the calling party. The information necessary for making announcements, or combinative portions thereof, may be prestored in voice response unit 123 by the subscriber. Such combinative portions may include caller instruction messages for use during call placement, e.g., "press 1 to talk to your party; press 2 to leave a voice mail message, etc." In one embodiment, the announcements are accessed by supplying voice response unit 123 with pointers to them. Voice response unit 123 is connected to switch fabric 118, so that the announcements may be routed to subscribers connected to application adjunct 131.

Communication interface 137 translates information for communication between application adjunct 131, and devices external to application adjunct 131. Attendant position 125, staffed by a human attendant, interfaces with application adjunct 131 to handle any questions that a subscriber or caller may have, or any problems that may arise.

IXC switch 105 includes: (a) main processor 107; (b) dual tone multi-frequency receiver (DTMF REC) 111; (c) directory services network interface 115; (d) bus 117; (e) switch fabric 118, and (f) optional voice recognition unit 116. Main processor 107 controls the overall operation of IXC switch 105 by performing any necessary processing and exchanging messages with the other components of IXC switch 105 over bus 117. Dual tone multi-frequency receiver (DTMC REC) 111 receives dual tone multi-frequency signals that are transmitted in response to the pressing of keys on the keypad of telephone station 101, and supplies the digit corresponding to each pressed key to main processor 107. IXC switch 105 also receives the caller's ANI from LEC 103 in the conventional manner.

Directory services network interface 115 is a protocol conversion unit that permits IXC switch 105 to communicate with application adjunct 131. It is responsible for formatting all messages transmitted to, and for extracting responses received from, application adjunct 131. Such messages include: (a) a message from IXC switch 105, indicating the ANI of the calling telephone; and (b) a message from application adjunct 131, indicating which destination telephone number the PCS call should presently be routed to. In one embodiment, the link between directory services network interface 115, and application adjunct 131, uses the well-known X.25 protocol.

Switch fabric 118 can connect the trunk on which the subscriber's call arrived at IXC switch 105, e.g., trunk 104 to: (a) dual tone multi-frequency receiver (DTMF REC) 111; (b) voice recognition unit 116; (c) voice response unit 123; or (d) to the rest of the interexchange carrier's network, via link 121. Some of the purposes of such connections are described further below.

In one embodiment of the invention, for ease of use and administration, each telephone number to which PCS calls can be routed to is stored in association with a pre-defined, mnemonic tag, and a corresponding identifier. Table 1 shows an exemplary list of such tags and their corresponding identifiers. In this embodiment, Table 1 is stored in data base 133. Table 1 may be implemented as an array in which the tags are the elements of the array and the identifiers are the corresponding indices into the array. Text-to-speech conversion may be used to speak the tags or, alternatively, there may also be stored pointers to information representing stored speech for each tag. The information representing speech may be stored in voice response unit 123, as noted.

TABLE 1

| TAG | IDENTIFIER |
| --- | --- |
| Home | 01 |
| Office | 02 |
| Secretary | 03 |
| Car Phone | 04 |
| Wife | 05 |
| Husband | 06 |
| Spouse | 07 |
| Roommate | 08 |
| Children | 09 |
| Neighbor | 10 |
| Mother | 11 |
| Father | 12 |
| Conference Room | 13 |
| Hotel | 14 |
| Restaurant | 15 |

Table 2 shows an exemplary table in which identifiers are associated with telephone numbers for a particular PCS subscriber having a unique personal telephone number. In one exemplary embodiment, the telephone numbers are stored in data base 133, as elements of an array, one array for each subscriber, and the identifiers are the corresponding indices into the array. The array may be stored in a compressed form.

TABLE 2

| IDENTIFIER | TELEPHONE # |
| --- | --- |
| 01 | 5559742211 |
| 02 | 5559497777 |
| 03 | 5559492211 |
| 04 | 5554152219 |
| 05 | |
| 06 | |
| 07 | 8005558100 |
| 08 | 8005554444 |
| 09 | 8005552312 |
| 10 | |
| 11 | |
| 12 | 2213861599 |
| 13 | 8334429181 |
| 14 | |
| 15 | |
| 16 | |

The stored associations between tags and telephone numbers may be used to create a sequence of locations to which the calls to a subscriber's personal telephone number should be routed. Again, such a sequence of destinations is known as "quick sequence." Each of a subscriber's quick sequences has a quick sequence number which is a unique numerical designation.

Figure 2:
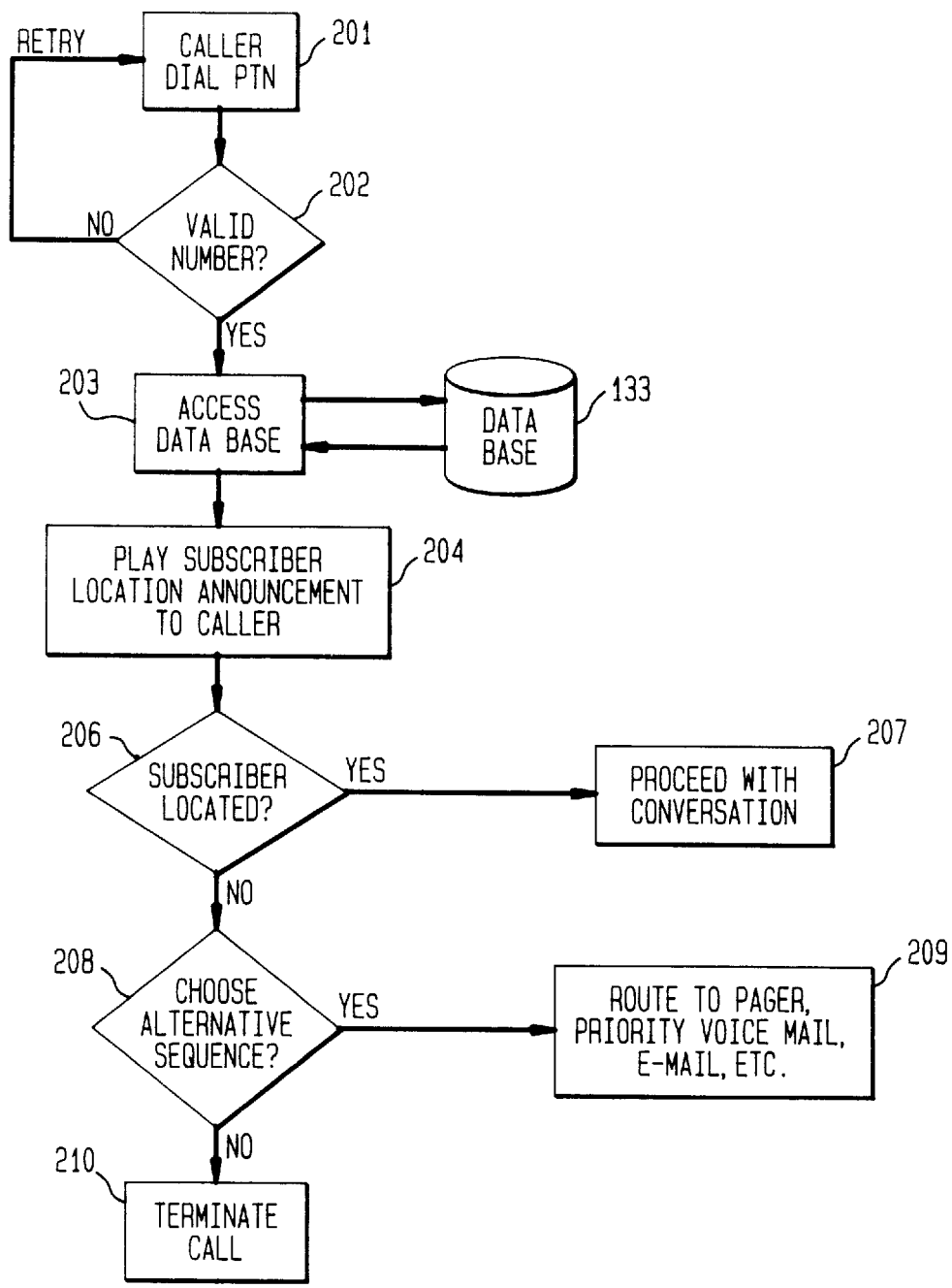
FIG. 2 shows a flow chart of an exemplary process for providing caller directive announcements in accordance with the instant invention.

Referring now to FIG. 2, there is shown a flow chart of an exemplary process for providing personal telecommunication services in accordance with the principles of the instant invention. The process is entered at step 201, when IXC switch 105 recognizes that the call is being placed to a personal telephone number. This is possible, because personal telephone numbers have certain unique characteristics that allow them to be differentiated from conventional telephone numbers. For example, they may have a unique area code and, within that area code, they may be further divided by unique exchange numbers that indicate to the inter-exchange carrier (IXC) that the call is directed to a personal telephone number. Prior to step 201, but part of the overall process of completing a PCS call, when a call is placed to a personal telephone number, e.g., by a calling party originating a call at a telephone station 101 (FIG. 1), a switch of local exchange carrier (LEC) 103 receives the dial digits and, from their unique characteristics, recognizes that the call is an IXC personal communications type of call. Local exchange carrier (LEC) 103 then routes the call over a trunk, e.g., trunk 104, to switch 105, of an inter-exchange carrier for further handling as per the process shown in FIG. 2.

At step 201, it is determined whether the personal telephone number received during step 201 is a valid number. If it is not a valid number, the caller is given the option of retrying the number just dialed.

Assuming it is a valid number, the method continues at step 203, when the data base shown in FIG. 1, i.e, data base 133, is accessed to recognize the subscriber associated with the personal telephone number inputted at step 201. Thereafter, a subscriber location announcement is relayed to the caller depending on the audio messages previously stored in data base 133 by the subscriber to the system.

The subscriber location announcement can depend on the ANI, or the PIN, of a caller. For example, the subscriber location announcement can be relayed to the caller only in response to the ANI received, such that only selected callers receive this option. Alternatively, the option can also be dependent upon the PIN of a particular caller, again giving the subscriber the option of only allowing particular callers to receive a subscriber location announcement.

The subscriber location announcement provided in step 204 could, for example, include one or more of the following messages: (1) "Your party is in a hotel, please ask for them by name;" (2) "Your party is in a conference room, please ask for them by name;" (3) "Your party is in a restaurant, please ask for them by name;" (4) "Your party is presently on the phone. Press 1 to see if they are able to take your call, press 2 to leave a voicemail, press 3 to leave priority voicemail, press 4 to page them;" (5) "Your party is busy" and route caller to voice mail; (6) "Your party is only accepting high priority calls. Press 1 to continue your call, press 2 to leave a voicemail, press 3 to leave priority voicemail, press 4 to page them." Additional audio messages could also be provided.

It is, of course, understood that the announcements set forth above would have been pre-recorded and stored in data base 133. Such announcements could be associated with the tags previously described. For example, when a "hotel" tag is chosen by the subscriber, this tag would be used as a pointer to retrieve the message from data base 133—"Your party is in a hotel, please ask for them by name." Similarly, the restaurant tag could be used to retrieve the message from data base 133—"Your party is in a restaurant, please ask for them by name."

The subscriber can concatenate prerecorded announcements to provide more explicit call direction to callers. For example, when a "hotel" tag is chosen by the subscriber, application adjunct 131 would request the subscriber provide the hotel room number (either by DTMF or voice recognition). The adjunct (131) then concatenates the pre-recorded hotel announcement "your party is in a hotel, ask for room" with prerecorded numbers which correspond with what the subscriber provided the adjunct to provide the resulting caller directive announcement "your party is in a hotel, ask for room 1306." Similarly, prerecorded names could be selected by a subscriber and concatenated with an announcement, for example, "your party is in a conference room, ask for John." Caller directive announcements may be professionally prerecorded, or prerecorded by the subscriber.

At step 206, the decision is made as to whether or not the subscriber has been located. If the answer is "yes," the conversation proceeds as indicated at step 207. Conversely, if the subscriber is not located as a result of the subscriber location announcement, the method moves to step 208 where alternative sequence may be chosen by the caller.

Such an alternative sequence may not be available if the initial call from the caller to the subscriber is answered at a hotel, restaurant or other public location where the hardware and/or the software necessary to achieve alternative sequence routing may not be available. In that instance, the call would be terminated if the subscriber could not be located.

Assuming that an alternative sequence were available, the method would move to step 209, where the caller would have the option of choosing voice mail, E mail, paging the subscriber, etc. Should the caller decline such an alternative sequence, the call would be terminated at step 210.

The foregoing merely illustrates the principles of the invention. It will, thus, be appreciated that those skilled in the art will be able to devise various arrangements which, although not explicitly described or shown herein, embody the principles of the invention and are, thus, within its spirit and scope.

What is claimed is:

1. A method for use in a telephone system to provide a plurality of caller directive announcements of which at least one is used to advise a caller on a rapid manner of reaching a chosen subscriber, the method comprising the steps of:

receiving at an interexchange carrier switching center an incoming call from a caller, applying the incoming call to a switch means located in the interexchange carrier switching center, transferring selective information concerning said incoming call to an application adjunct system in the interexchange carrier switching center, storing a plurality of caller directive announcements in an application adjunct system data base, associating said plurality of caller directive announcements with predetermined location indicators previously stored in said application adjunct system data base by said subscriber, said location indicators identifying locations at which said subscriber may be reached in a rapid manner, accessing said predetermined location indicators in said application adjunct system data base in response to information provided by said caller to retrieve selected ones of said caller directive announcements associated with said predetermined location indicators, announcing to said caller from said interexchange carrier switching center at least one of said plurality of caller directive announcements, and establishing a communications link between said caller and said subscriber after the announcement of said caller directive announcement.

2. A method in accordance with claim 1, wherein there is further included the step of giving said caller an option to choose an alternative communication sequence should said subscriber not be reached in response to said caller acting in response to said caller directive announcement.

3. A method in accordance with claim 1, wherein there is further included the step of terminating a calling sequence if said subscriber is not reached by said caller.

4. A method in accordance with claim 1, wherein said caller directive announcement includes a plurality of concatenated prerecorded announcements.

5. A method in accordance with claim 1, wherein said information provided by said caller includes an ANI designation.

6. A method in accordance with claim 1, wherein said information provided by said caller includes a PIN designation.

7. A method in accordance with claim 2, wherein said alternative communication sequence includes paging said subscriber.

8. A method in accordance with claim 2, wherein said alternative communication sequence includes granting said caller access to said subscriber's voice mail.

9. A method in accordance with claim 2, wherein said alternative communication sequence includes granting said caller access to a subscriber's E mail.

* * * * *